United States Patent
Lin

(10) Patent No.: US 9,228,603 B2
(45) Date of Patent: Jan. 5, 2016

(54) CRACK-PROOF SCREW

(71) Applicant: Teng-Hung Lin, Kaohsiung (TW)

(72) Inventor: Teng-Hung Lin, Kaohsiung (TW)

(*) Notice: Subject to any disclaimer, the term of this patent is extended or adjusted under 35 U.S.C. 154(b) by 0 days.

(21) Appl. No.: 14/271,440

(22) Filed: May 6, 2014

(65) Prior Publication Data

US 2015/0322989 A1 Nov. 12, 2015

(51) Int. Cl.
*F16B 25/10* (2006.01)
*F16B 25/00* (2006.01)

(52) U.S. Cl.
CPC ......... *F16B 25/0073* (2013.01); *F16B 25/0015* (2013.01)

(58) Field of Classification Search
CPC .................. F16B 25/0073; F15B 25/0015
USPC ................. 411/411, 412, 415, 387.1
See application file for complete search history.

(56) References Cited

U.S. PATENT DOCUMENTS

| | | | | |
|---|---|---|---|---|
| 3,827,331 | A * | 8/1974 | Muenchinger | 411/387.4 |
| 4,834,602 | A * | 5/1989 | Takasaki | 411/386 |
| 6,000,892 | A * | 12/1999 | Takasaki | 411/413 |
| 7,070,376 | B1 * | 7/2006 | Toback | 411/82.2 |
| 8,348,572 | B2 * | 1/2013 | Friederich et al. | 411/387.1 |
| 2003/0235483 | A1 * | 12/2003 | Chen | 411/387.7 |
| 2007/0237606 | A1 * | 10/2007 | Takasaki | 411/387.2 |
| 2012/0294693 | A1 * | 11/2012 | Gonciarz et al. | 411/387.1 |
| 2013/0302110 | A1 * | 11/2013 | Park | 411/387.1 |

\* cited by examiner

*Primary Examiner* — Gary Estremsky

(57) ABSTRACT

A crack-proof screw comprises a head; a rod having a first end extending from the head and having a rod thread near the head and expanding threads far away from the head; each expanding thread encircled through an angle smaller than 360 degrees; the screwing direction of the expanding thread being identical to or different from that of the rod thread; a tapered tail extending from a second end of the head; the expanding threads on the rod being near the tapered tail; the tapered tail having two drilling threads; each drilling thread can be extended to or not extended to the tip end of the tapered tail.

2 Claims, 1 Drawing Sheet

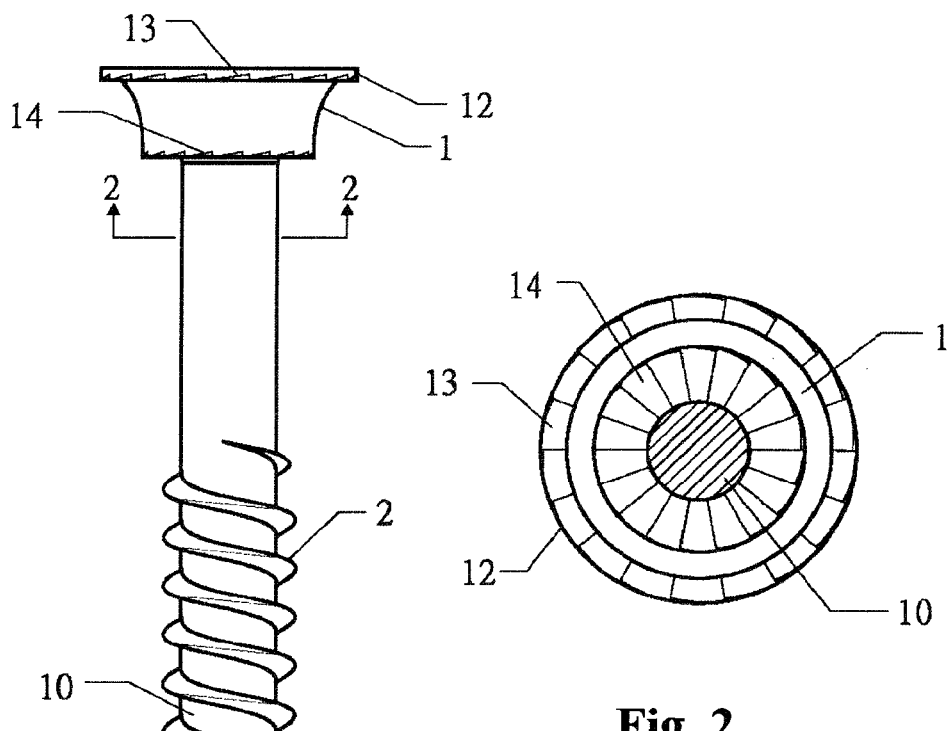
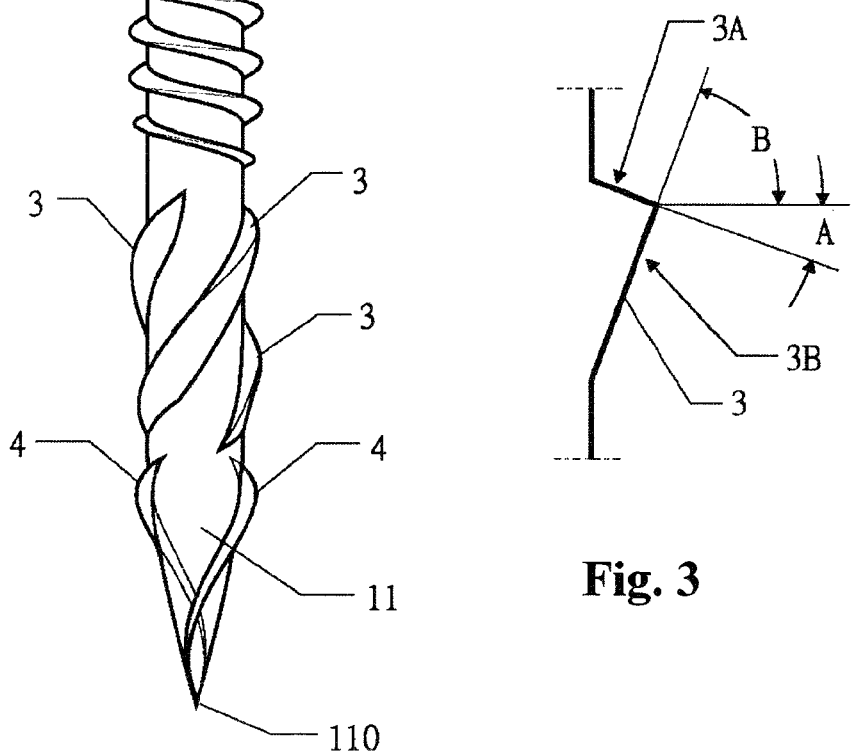
Fig. 1
Fig. 2
Fig. 3

CRACK-PROOF SCREW

FIELD OF THE INVENTION

The present invention relates to screws, and in particular to a crack-proof screw which includes a rod thread, expanding threads and drilling threads. The screw of the present invention can drill an object quickly with less force and achieve the object of the crack-proof.

BACKGROUND OF THE INVENTION

Many design ways are used in designs of screws, such as single section, double sections, single thread, double threads, single diameter, double diameters, single pitch angle, double pitch angles, etc. All these designs present different effects in use of screws, such as the effects of drilling speeds, dregs removing, and retaining.

In the design of the screws, the designs of screws are based on the characters of the material and the object to be drilled. Generally, screws are made of different material, such as woods, plastics, metals, compound materials, etc. For a screw screwing into a wood, due to the property of the wood, it is often that the wood will crack. Thus it is necessary to have screws which have the property of crack proof.

SUMMARY OF THE INVENTION

The object of the present invention is to provide a crack-proof screw which includes a rod thread, expanding threads and drilling threads. The screw of the present invention can drill an object quickly with less force and achieve the object of the crack-proof.

To achieve above object, the present invention provides a crack-proof screw comprising: a head having a lateral surface which is formed with an axial annular outer ring at an upper side thereof; an upper annular area of the annular outer ring being a flat ring portion and a lower annular area of the annular outer ring being a ratchet tooth area; a lower side of the lateral surface of the head being formed with ratchet teeth; a rod having a first end extending from the head and having a rod thread near the head and expanding threads far away from the head; each expanding thread encircled through an angle smaller than 360 degrees; the screwing direction of the expanding thread being identical to or different from that of the rod thread; an angle A being defined an angle between an upper side of each expanding thread and a line vertical to a surface of the rod; an angle B being defined an angle between an lower side of each expanding thread and a line vertical to a surface of the rod; the angle B being greater than the angle A and the summation of the angle B and angel A being equal to or greater than 90 degrees; and a tapered tail extending from a second end of the head; the expanding threads on the rod being near the tapered tail; the tapered tail having two drilling threads; each drilling thread can be extended to or not extended to the tip end of the tapered tail.

The various objects and advantages of the present invention will be more readily understood from the following detailed description when read in conjunction with the appended drawing.

BRIEF DESCRIPTION OF THE DRAWINGS

FIG. 1 shows the structure of the present invention.
FIG. 2 is a cross sectional view viewed from the line 2-2 of FIG. 1.
FIG. 3 is a schematic view showing the angles relations of the upper side and the lower side of the expanding thread.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIG. 1, the embodiment of the present invention is illustrated. The crack-proof screw of the present invention includes the following elements.

A head 1 has a lateral surface which is formed with an axial annular outer ring at an upper side thereof. An upper annular area of the annular outer ring is a flat ring portion 12 and a lower annular area of the annular outer ring is a ratchet tooth area 13. A lower side of the lateral surface of the head 1 is formed with ratchet teeth 14. However, within the scope of the present invention, the head 1 may have other form which is not used to confine the scope of the present invention.

A rod 10 has a first end extending from the head 1 and has a rod thread 12 near the head 1 and expanding threads 3 far away from the head 1.

Each expanding thread 3 is encircled through an angle smaller than 360 degrees. The screwing direction of the expanding thread 3 is identical to or different from that of the rod thread 12. An angle A is defined an angle between an upper side 3A of each expanding thread 3 and a line vertical to a surface of the rod 10. An angle B is defined an angle between a lower side 3B of each expanding thread 3 and a line vertical to a surface of the rod 10. In that, the angle B is greater than the angle A and the summation of the angle B and angel A is equal to or greater than 90 degrees.

A tapered tail 11 extends from a second end of the head 1. The expanding threads 3 on the rod 10 are near the tapered tail 11. The tapered tail 11 has two drilling threads 4. Each drilling thread 4 can be extended to or not extended to the tip end 110 of the tapered tail 11.

Thus, by the structure of the present invention, the designs of the rod thread 12, the expanding threads 3 and the drilling threads 4, the screw of the present invention can drill an object quickly with less force and achieve the object of the crack-proof.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A crack-proof screw comprising:
a head;
a rod having a first end extending from the head and having a rod thread near the head and expanding threads far away from the head;
each expanding thread encircled through an angle smaller than 360 degrees; the screwing direction of the expanding thread being identical to or different from that of the rod thread; an angle A being defined as an angle between an upper side of each expanding thread and a line vertical to a surface of the rod; an angle B being defined as an angle between an lower side of each expanding thread and a line vertical to a surface of the rod; the angle B being greater than the angle A and the summation of the angle B and angle A being equal to or greater than 90 degrees;

a tapered tail (11) which extends from an end of the rod (10) that is distal to the head (1); the expanding threads on the rod being near the tapered tail; the tapered tail having two drilling threads; each drilling thread can be extended to or not extended to the tip end of the tapered tail.

2. A crack-proof screw comprising:

a head having a lateral surface which is formed with an axial annular outer ring at an upper side thereof; an upper annular area of the annular outer ring being a flat ring portion and a lower annular area of the annular outer ring being a ratchet tooth area; a lower side of the lateral surface of the head being formed with ratchet teeth;

a rod having a first end extending from the head and the rod having a rod thread near the head and expanding threads far away from the head; each expanding thread encircled through an angle smaller than 360 degrees; the screwing direction of the expanding thread being identical to or different from that of the rod thread; an angle A being defined as an angle between an upper side of each expanding thread and a line vertical to a surface of the rod; an angle B being defined as an angle between an lower side of each expanding thread and a line vertical to a surface of the rod; the angle B being greater than the angle A and the summation of the angle B and angle A being equal to or greater than 90 degrees; and a tapered tail (11) which extends from an end of the rod (10) that is distal to the head (1); the expanding threads on the rod being near the tapered tail; the tapered tail having two drilling threads; each drilling thread can be extended to or not extended to the tip end of the tapered tail.

* * * * *